United States Patent [19]
Fling et al.

[11] Patent Number: 4,623,913
[45] Date of Patent: Nov. 18, 1986

[54] PROGRESSIVE SCAN VIDEO PROCESSOR

[75] Inventors: Russell T. Fling, Noblesville; Donald H. Willis, Indianapolis, both of Ind.

[73] Assignee: RCA Corporation, Princeton, N.J.

[21] Appl. No.: 600,931

[22] Filed: Apr. 13, 1984

[51] Int. Cl.$^4$ ............................................. H04N 7/01
[52] U.S. Cl. ...................................... 358/11; 358/140; 358/37; 358/166
[58] Field of Search ................................. 358/11–16, 358/21 R, 64, 135, 140, 153, 166, 217, 242, 160, 36, 37

[56] References Cited

U.S. PATENT DOCUMENTS

| | | | |
|---|---|---|---|
| 4,245,237 | 1/1981 | Lagoni | 358/31 |
| 4,415,931 | 11/1983 | Dischert | 358/242 |
| 4,558,347 | 12/1985 | Pritchard | 358/11 |

Primary Examiner—Michael A. Masinick
Attorney, Agent, or Firm—P. J. Rasmussen; P. M. Emanuel; R. G. Coalter

[57] ABSTRACT

A digital video signal processing circuit generates interlaced luminance and chrominance signals from interlaced composite color video signals. The interlaced luminance signal contains vertical detail information without peaking. Each of two progressive scan speed-up processors, controlled to operate in parallel, receives the interlaced luminance and chrominance signals. In each of the speed-up processors, the chrominance signals are time compressed and repeated to generate two lines of time compressed chrominance video for each line of interlaced chrominance video. Furthermore, in each of the speed-up processors, a vertical detail signal is regenerated that contains vertical detail information derived from the interlaced luminance signal. The vertical detail signal is nonlinearly processed to generate a vertical peaking signal that is combined with the vertical detail signal. A time compression stage speeds up the peaked vertical detail signal to a double line rate. Another time compression stage speed up a luminance signal containing high frequency information. The time compressed peaked vertical detail signal and the time compressed high frequency luminance signal are combined to generate a time compressed enhanced luminance signal, such that alternate lines of the enhanced luminance signal contain vertical peaking information of opposing polarities. The parallel operation of the two speed-up processors is controlled to enable one of the processors to function in the write mode to store samples of the interlaced luminance and chrominance signals while the other speed-up processor functions in the read mode to read out samples of time compressed enhanced luminance and time compressed chrominance signals. The outputs of the two speed-up processors are multiplexed and applied to a color matrix to generate the time compressed lines of noninterlaced red, green and blue signals.

3 Claims, 3 Drawing Figures

PROGRESSIVE SCAN VIDEO PROCESSOR

This invention relates to a progressive scan video processor that generates noninterlaced lines of video from an interlaced video signal.

Recent interest in the development of high definition television systems has been directed to techniques intended to enhance the subjective performance of present systems within the constraints of existing standards. In one approach, progressive or noninterlaced scanning is used. The incoming video signal, supplied in a conventional two-to-one vertical interlaced format, is first stored in a memory and then subsequently read out of the memory at a double line rate in a noninterlaced or line progressively scanned manner. Each line of incoming video generates two lines of display video.

One form of a progressive scan video processor is a line interpolation progressive scan system using line sotres to generate time compressed lines of luminance and chrominance video from the luminance and chrominance information contained in the interlaced vidpeo lines within the same field. To avoid the loss of sharpness in vertical transitions that may occur when using line interpolation progressive scan, vertical peaking information is inserted into the noninterlaced time compressed lines of display video. To properly display the peaking portions in the display video, the vertical peaking information alternates in polarity from one time compressed video line to the next time compressed line of video.

In accordance with an aspect of the invention, the memory storage requirement in a line progressive video processing system is kept small by providing two time compression stages operated in parallel. Each of the time compression stages processes interlaced luminance and chrominance signals which are generatede at a first line rate. Each processor extracts verticla peaking information from the interlaced luminance information to generate a time compressed enhanced luminance signal that is generated at a second faster line rate that is a multiple of the first line rate. The enhanced luminance signal contains vertical peaking information in the proper opposing polarities in alternate lines of time compressed display video.

In accordance with another aspect of the invention, the time compression stages are adaptable for use with conventional interlaced digital video signal processors that gneerate interlaced luminance signals that are already enhanced with vertical detail information. In a line progressive scan video processing system, veritcal peaking of opposite polarities is derived from the vertical detail information. The time compression stages, in accordance with this aspect of this invention, processes the interlacedluminance signal so as to first extract the vertical detail information, generate vertical peaking information of opposing polarities fromthe extracted vertical detail information, and then reinsert the vertical detail information and the vertical peaking information into the luminance channel to produce time compressed lines of luminance video that contain both vertical detail information and vertical peaking information of opposing polarities in alternate time compressed lines.

Figure 1:
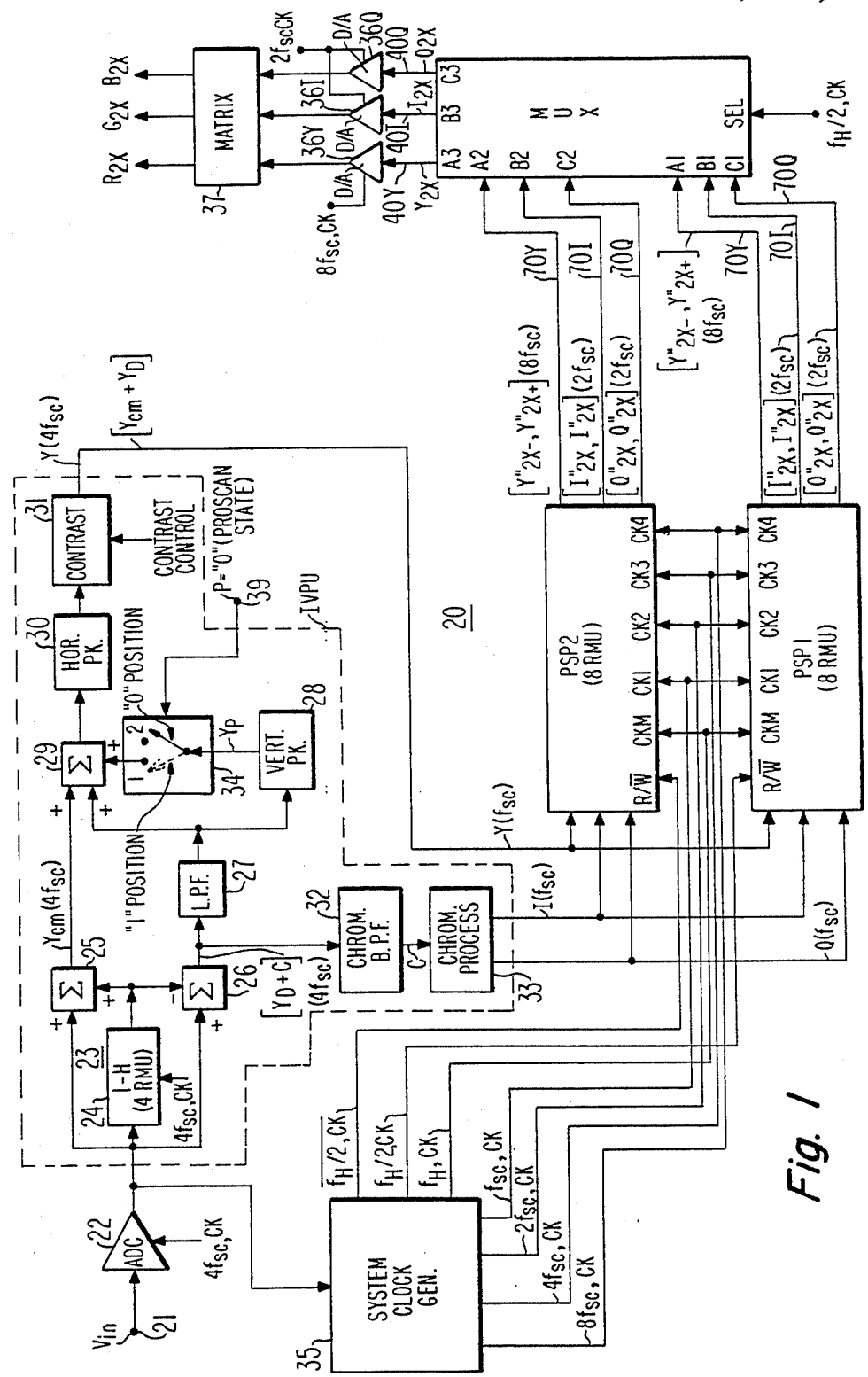
FIG. 1 illustrates a progressive scan video processor embodying the invention.

In progressive scan video processor 20, illustrated in FIG. 1, a composite color video signal $V_{in}$ is developed at a terminal 21 by conventional television receiver circuitry, not illustrated. Video signal $V_{in}$ comprises an interlaced signal, such as a color NTSC signal, wherein 525 video lines are generated each frame, at a 30 Hz frame rate with a two-to-one interlace factor, wherein the video line rate of $f_H$ is 15.734 kilohertz, and wherein the frequency $f_{sc}$ of the color subcarrier is 3.58 megahertz. Video processor 20 may be suitably modified to process interlaced video signals in other formats.

Interlaced video signal $V_{in}$ is applied to an analog-to-digital converter, ADC 22, clocked at a $4f_{sc}$ rate, to develop digital samples of the video signal at the $4f_{sc}$ rate. The digitized video signal is coupled to a system clock generator 35 for developing various clock signals in progressive scan video processor 20 that are synchronized with the synchronizing signals in the video signal, such as with the color burst signal and the horizontal sync signal. System clock generator 35 generates a clock signal $\overline{f_H,ck}$, illustrated in FIG. 3a, that repeats at the horizontal line rate $f_H$; a clock signal $f_H/2$,ck, illustrated in FIGS. 3b and 3c, that repeats at half of the line rate, or at a rate of $f_H/2$; a clock signal $f_H/2$,ck, illustrated in FIG. 3e, that is 180° out of phase with the clock signal $f_H/2$,ck, a clock signal $f_{sc}$,ck, repeating at the color subcarrier frequency $f_{sc}$, a clock signal $2f_{sc}$,ck, repeating at a rate of two times the color subcarrier frequency, a clock signal $4f_{sc}$,ck, repeating at a rate of four times the color subcarrier frequency, and a clock signal $8f_{sc}$,ck, repeating at a rate of eight times the color subcarrier frequency.

Digitized interlaced video signal $V_{in}$ is applied to a line comb filter 23 which comprises a 1−H delay unit 24, an adder 25 which arithmetically adds the delayed video line to the undelayed video line, and a subtractor 26 which arithmetically subtracts the delayed video line from the undelayed video line.

Delay unit 24 may comprise a CCD delay line that stores samples of the digitized video signal. If the digital samples comprise digital words in binary format wherein each digital sample comprises one byte eight bits in length, for example, then delay unit 24 comprises a digital memory such as a random access memory (RAM). Assume for illustrative purposes that ADC 22 generates the digital samples as digital words of eight bit bytes, and delay unit 24 comprises a random access memory. The storage capacity of 1−H delay 24 is large enough to store sufficient samples of the incoming video signal $V_{in}$ to adequately sample the highest video frequencies occurring in the video signal. For an NTSC video signal having a luminance bandwidth of approximately 4.2 megahertz, a sampling rate of $4f_{sc}$ is adequate to satisfy the above criterion. Clock signal $4f_{sc}$,ck is therefore coupled to the sample clock terminal of delay unit 24.

At a sampling rate of $4f_{sc}$, the capacity required for delay unit 24 to store one video line is 910 samples. Assuming delay unit 24 comprises a RAM, then the memory size of delay unit 24 is 910 eight bit bytes or 7280 bits. Define a standard memory size, 1 RMU, as 227 eight bit bytes, then the memory capacity of 1−H delay 24 comprises approximately 4 RMU, a capacity sufficient to store one line of NTSC video at a sampling rate of $4f_{sc}$.

A combed luminance signal $Y_{cm}$ is developed by comb filter 23 at the output of adder 25. The digital samples of combed luminance signal $Y_{cm}$ are developed at a $4f_{sc}$ rate. A combed signal is developed by comb filter 23 at the output of subtractor 26 that contains chrominance information in the frequency range around the color subcarrier frequency $f_{sc}$ and that contains luminance vertical detail information at lower frequencies, below frequencies of 1.5 to 1.8 megahertz, for example. The digital samples at the output of subtractor 26 are also developed at the $4f_{sc}$ rate.

A bandpass filter 32 removes from the output of subtractor 26 frequencies below and above the modulated chrominance frequencies to develop a chrominance signal C. Chrominance signal C is coupled to chrominance processor 33. Chrominance processor 33 provides automatic color control and other processing functions and performs color demodulation to develop digital samples of the color mixture signal I at one output and digital samples of the quadrature related color mixture signal Q at another output. Because the frequency range of the color mixture signals are much narrower than that of the luminance signal, the sample rate of the I and Q digital signals is at the lower, $f_{sc}$ rate.

The combed signal at the output of subtractor 26 is coupled to a low pass filter 27 to separate the luminance vertical detail information from the chrominance information. A luminance signal $Y_D$ at the output of filter 27 contains separated luminance vertical detail information.

Vertical detail signal $Y_D$ and combed luminance signal $Y_{cm}$ are added in an adder 29 to restore vertical detail information into the luminance channel. Horizontal peaking is provided by a horizontal peaking stage 30, and contrast adjustment of the luminance signal both automatically and under viewer control is accomplished by a contrast stage 31 to develop a luminance signal Y. The digital samples of luminance signal Y are developed at the $4f_{sc}$ rate.

In addition to vertical detail restoration, enhancement of vertical transitions in the luminance signal may be accomplished by providing vertical peaking during vertical transitions. The vertical detail luminance signal $Y_D$ is coupled to a nonlinear processor, vertical peaking stage 28, of conventional design, to develop a luminance peaking signal $Y_P$ that contains only preshoot and overshoot information of vertical transitions. Vertical peaking signal $Y_P$ is coupled to adder 29 via the arm and contact terminal #1 of a controllable switch 34. The throw position of switch 34 is controlled by the logical state of a control terminal 39. When the state of control terminal 39 is high, for example, the arm of switch 34 makes contact with terminal #1 as illustrated by the dotted line arm position of FIG. 1. When the state of control terminal 39 is low, the arm of switch 34 makes contact with terminal #2 as illustrated by the solid line arm position of FIG. 1. Thus, if it is desired to enhance luminance signal Y by incorporating vertical peaking, a high state is developed at control terminal 39; whereas if it desired to omit vertical peaking from luminance signal Y, a low state is developed at control terminal 39.

As thus far described, the video processing of interlaced video signal $V_{in}$ has been performed in a conventional manner using known prior art circuits and techniques to generate interlaced luminance signal Y and interlaced color mixture signals I and Q. Such video processing stages encompassed within the box labeled IVPU, may be provided using one or more conventionally designed integrated circuits.

In accordance with a feature of the invention, progressive scan video processor 20 is adapted for use with a conventional interlaced video processor unit such as processor unit IVPU, to generate noninterlaced lines of luminance from interlaced lines of luminance. In accordance with another aspect of the invention, each of the three interlaced component signals Y,I,Q is coupled to each of two speed-up processors, PSP1 and PSP2. The two processors are operated in parallel to generate two sets of time compressed, double line rate luminance and color mixture video component signals, that are multiplexed for noninterlaced display. Because the entire speed-up processing requires relatively large memory capacity, parallel operation reduces the memory storage requirements of an individual unit by one half.

In accordance with an aspect of the invention, the vertical detail information is extracted from the interlaced luminance signal developed by the IVPU unit and then separately time compressed. In accordance with another aspect of the invention, vertical peaking information is derived from the extracted vertical detail information and inserted into the time compressed luminance signal generated by speed-up processors PSP1 and PSP2.

To precondition interlaced video processor unit IVPU to operate as part of progressive scan video processor 20, vertical peaking signal $Y_p$ is omitted from interlaced luminance signal Y. Vertical peaking is omitted because the peaking will be performed later in progressive scan speed-up processors PSP1 and PSP2, as described below.

A signal P is coupled to terminal 39 of switch 34. Signal P exhibits a low state when progressive scan video processing is being performed. Signal P may be generated by, for example, grounding terminal 39. With control terminal 39 in the low state, the arm of switch 34 makes contact with terminal #2, preventing signal $Y_p$ from being inserted into interlaced luminance signal Y.

In FIG. 1, each of the three interlaced video component signals Y,I,Q, is coupled to each of the two progressive scan speed-up processors PSP1 and PSP2. Speed-up processors PSP1 and PSP2 are similarly designed and are controlled for parallel processing operation by means of various clock and control signals coupled to sampling clock terminals CK1 through CK4 and control terminals $R/\overline{W}$ and CKM of the speed-up units, as described later on.

Figure 3:
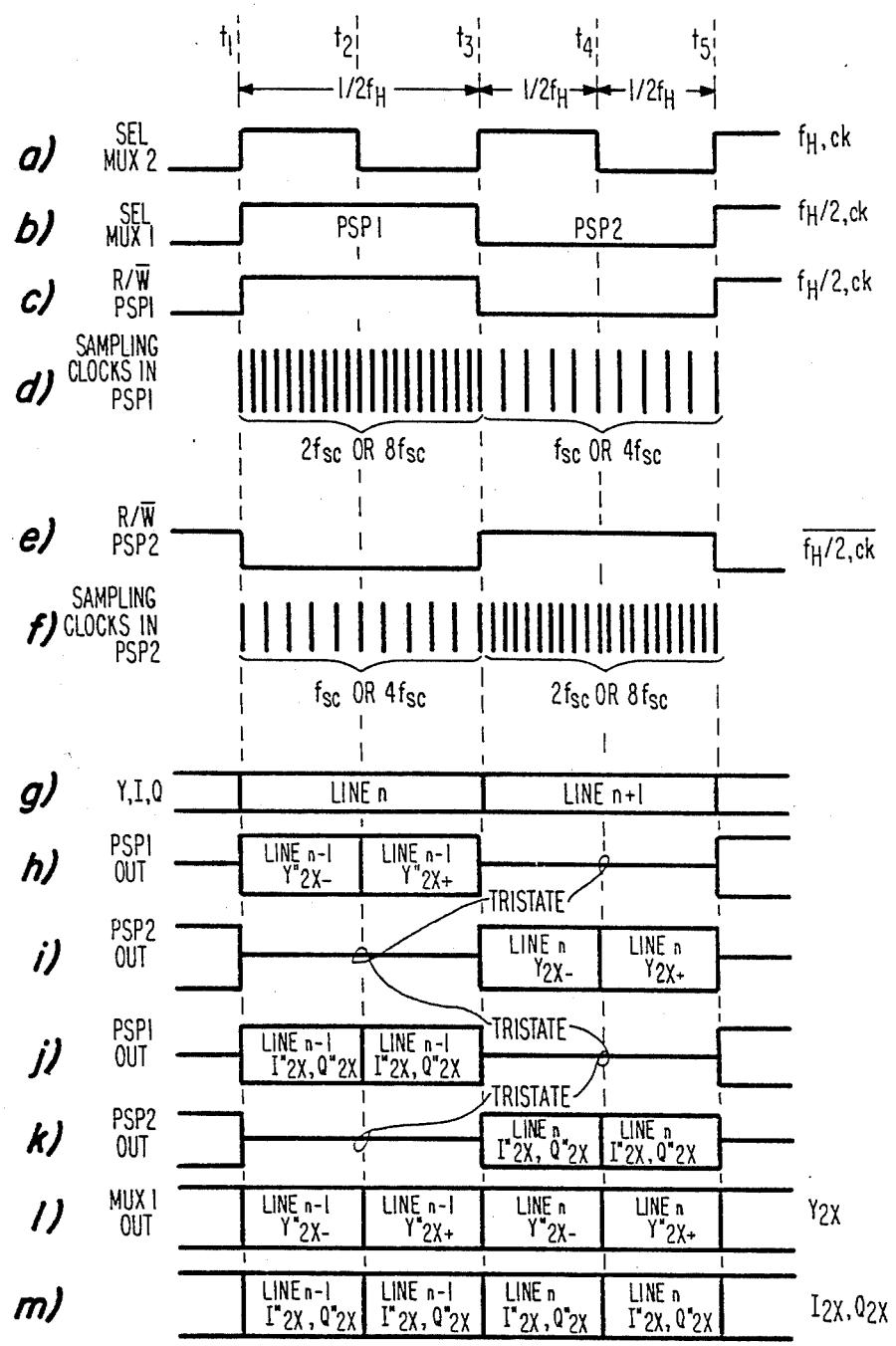
FIG. 3 illustrates waveforms useful in explaining the operation of the circuits of FIGS. 1 and 2.

Digital samples coupled to either one of the speed-up processors PSP1 and PSP2 are written into memory when the corresponding control terminal $R/\overline{W}$ is in the low state. Digital samples are read out of the memory when the control terminal $R/\overline{W}$ is in the high state. Clock signal $f_H/2,ck$ illustrated in FIG. 3c, is coupled to control terminal $R/\overline{W}$ of speed-up processor PSP1. The 180° out of phase clock signal $\overline{f_H/2,ck}$ is coupled to control terminal $R/\overline{W}$ of speed-up processor PSP2. Thus, when one of the speed-up processors is writing into its memory video samples of the component signals Y, I and Q, the other speed-up processor is reading out of its memory the previously stored line of video samples.

Assume the component signals Y, I and Q, coupled to each of speed up processors PSP1 and PSP2, contain samples of the nth interlaced video line between times $t_1$ and $t_3$, as schematically represented in FIG. 3g. During this interval, control terminal R/$\overline{W}$ of speed-up processor PSP2 is low as illustrated in FIG. 3e. Write clock terminals CK1 and CK3 in speed-up processor PSP2 are enabled, permitting the luminance digital samples Y developed at the $4f_{sc}$ rate and the color mixture samples, I and Q, each developed at the $f_{sc}$ rate, to be written into their respective memory locations, as schematically indicated by the vertical line sampling clocks illustrated in FIG. 3f between times $t_1$ and $t_3$.

Internal to the speed-up processor, in a manner that is described later, vertical peaking is added to the vertical detail information contained in the luminance signal.

During the interval $t_1$ through $t_3$, control terminal R/$\overline{W}$ of speed-up processor PSP1 is in the high state, as illustrated in FIG. 3c. Read clock terminals CK2 and CK4 of speed-up processor PSP1 are enabled. As schematically indicated by the vertical line sampling clocks of FIG. 3d, the stored samples of luminance information are read out of memory at the $8f_{sc}$ rate, double the $4f_{sc}$ rate at which they were written into the memory, and the stored samples of I and Q color mixture information are read out of memory at the $2f_{sc}$ rate, double the rate at which they were written into memory. Thus, for each interlaced video line of the three component signals Y, I and Q stored in speed-up processor PSP1 there are generated two, time compressed, double line rate, $2f_H$, lines of display video.

Internal to speed-up processor PSP1, as described later, the vertical peaking information is opposing in polarity in alternate lines of the time compressed, double line rate luminance signal. As illustrated in FIG. 3h, when line n of the interlaced video signal $V_{in}$ is developed at terminal 21 of FIG. 1, time compressed signals are developed at the luminance output signal line 70Y of speed-up processor PSP1 that contain luminance information from the previous line n−1. During the interval $t_1$ through $t_2$, a time compressed line of luminance display video Y"$_{2x-}$ is generated, containing vertical peaking information of one polarity. During the interval $t_2$ through $t_3$, a time compressed line of luminance display video Y"$_{2x+}$ is generated, containing vertical peaking information of the opposite polarity. Such alternating of the polarities of the vertical peaking information is required in line interpolation progressive scanning to properly locate preshoots and overshoots in vertical transitions.

To generate time compressed, double line rate color mixture signals on the I and Q output signal lines 70I and 70Q, respectively, of speed-up processor PSP1, an interlaced video line of the I and Q component signals that is stored in the speed-up processor is read out of memory twice, and at the faster, $2f_{sc}$ rate. Thus, as illustrated in FIG. 3j, the previous line n−1 of video is read out of memory both during the intervals $t_1$ through $t_2$ and $t_2$ through $t_3$, as the time compressed I and Q signal components I"$_{2x}$ and Q"$_{2x}$.

During the next interlaced video line interval, between time $t_3$ and time $t_5$ of FIGS. 3a–3m, the operating modes of speed-up processors PSP1 and PSP2 interchange, with speed-up processor PSP1 operating in the write mode and speed-up processor PSP2 operating in the read mode.

To generate a complete sequence of pairs of noninterlaced lines of display video from the information contained in the interlaced lines of video signal $V_{in}$, the outputs of speed-up processors PSP1 and PSP2 are multiplexed onto respective signal lines 40Y, 40I and 40Q by a multiplexer MUX 1. Output signal lines 70Y, 70I, 70Q of speed-up processors PSP1 and PSP2 are coupled to respective input ports of MUX 1, with input ports A1, B1, C1 receiving signals from speed-up processor PSP1 and with input ports A2, B2, C2 receiving signals from speed-up processor PSP2. The control clock signal, $f_H/2$,ck, is coupled to the select terminal, SEL, of MUX 1. When select terminal SEL is high, the signals coupled to input ports A1, B1, C1 are transferred to output ports A3, B3, C3, respectively. When select terminal SEL is low, the signals coupled to input ports A2, B2, C2 are transferred to the output ports.

The time compressed, double line rate luminance signal $Y_2$ developed at output port A3 on a signal line 40Y is schematically illustrated in FIG. 3L. Video lines of the signal $Y_{2x}$ alternate between a time compressed line of luminance that contains vertical peaking in one polarity and a time compressed line of luminance that contains vertical peaking in the opposite polarity. The time compressed, double line rate color mixture signals $I_{2x}$ and $Q_{2x}$, developed at output ports B3 and C3, respectively, on signal lines 40I and 40Q, respectively, are illustrated schematically in FIG. 3m. During one line interval, $1/f_H$, of the interlaced video signal $V_{in}$, a time compressed video line of the signals $I_{2x}$ and $Q_{2x}$ is twice generated for display in a pair of noninterlaced scan lines.

Multiplexer MUX 1 may be eliminated if output signal lines 70Y, 70I and 70Q of each of the speed-up processors PSP1 and PSP2 are tri-state outputs, wherein the signal lines are in an open-circuit state when the speed-up processor is in the write mode of operation. In this case, output signal lines 70Y, 70I and 70Q of PSP1 are tied to output signal lines 70Y, 70I and 70Q of PSP2, respectively. The tied-together output signal lines are then directly coupled to analog-to-digital converters 36Y, 36I and 36Q, respectively.

The time compressed component signals $Y_{2x}$, $I_{2x}$, $Q_{2x}$ are coupled to respective digital-to-analog converters 36Y, 36I, 36Q for conversion to analog component signals. The analog signals are combined in a color matrix 37 to generate time compressed, double line rate, noninterlaced video lines of red, green and blue analog signals $R_{2x}$, $G_{2x}$, $B_{2x}$. The information contained in red, green and blue analog video signals are displayed on the picture tube screen of the television receiver that generates a progressively scanned raster.

Figure 2:
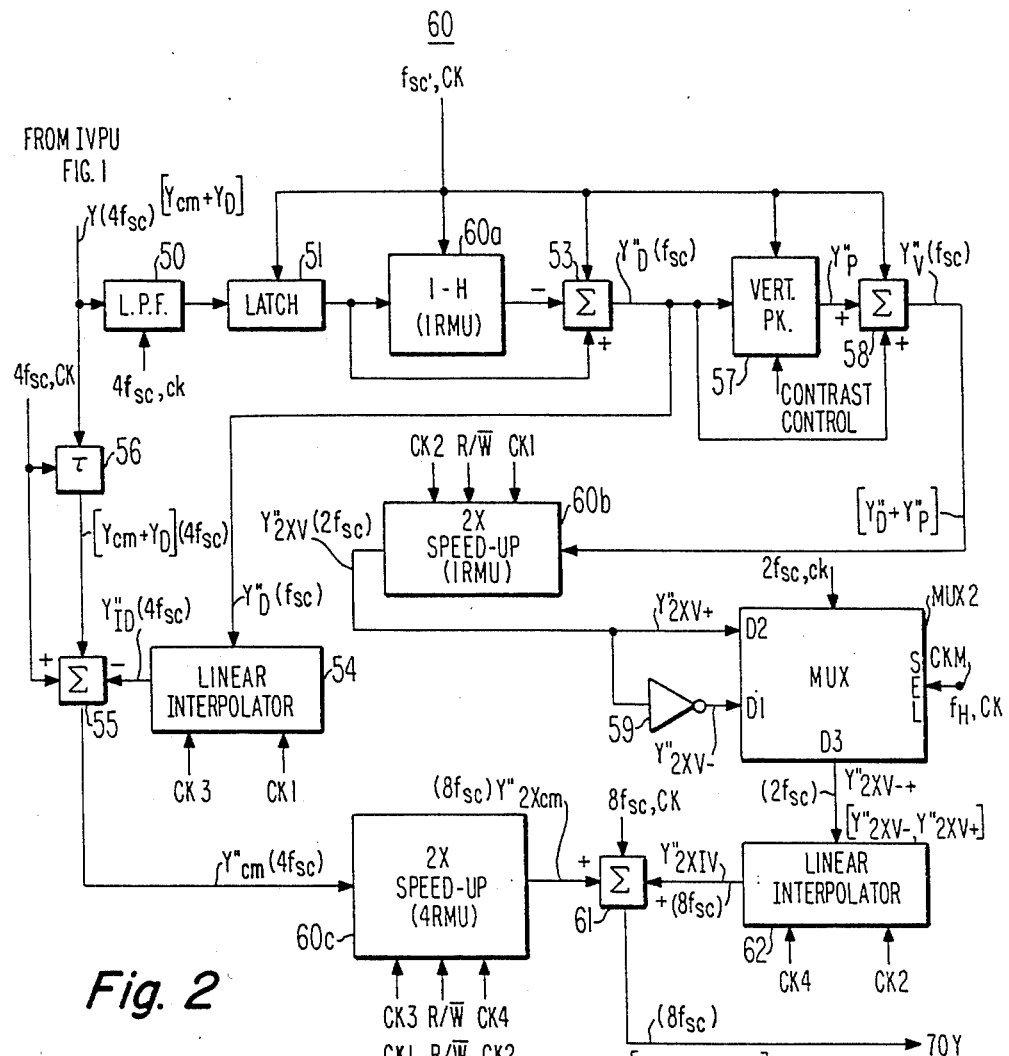
FIG. 2 illustrates a specific embodiment of a speed-up processor used in the circuit of FIG. 1.

FIG. 2 illustrates a specific embodiment, in accordance with an aspect of the invention, of a progressive scan speed-up processor PSP1 or PSP2 of FIG. 1. Items in FIGS. 1 and 2 similarly identified function in a similar manner or represent similar quantities.

In accordance with an aspect of the invention, vertical detail information from interlaced luminance signal Y is extracted by speed-up processor PSP of FIG. 2 in order to generate vertical peaking signals of opposing polarities in alternate time compressed lines of display video. Interlaced luminance signal Y of FIG. 2 is coupled to a low pass filter 50 that removes the high frequency content of the luminance signal.

To regenerate a vertical detail luminance signal, a line combing operation is performed on the output of low pass filter 50. The output of low pass filter 50 is coupled via a latch 51 to a memory unit 60a of a memory bank 60. Memory unit 60a serves as a 1−H delay. Digital samples are developed at the output of low pass filter 50 at the $4f_{sc}$ rate. To reduce the memory size of 1−H delay 60a, latch 51 passes to the input of delay 60a every fourth digital sample developed at the output of low pass filter 50. With low pass filter 50 being clocked at the $4f_{sc}$ rate, latch 51 and 1−H delay 60a are clocked at one quarter that rate, or are clocked at the $f_{sc}$ rate. No loss of resolution occurs by reducing the sample rate to the $f_{sc}$ rate because only relatively low frequency vertical detail information is being processed. At the $f_{sc}$ clock rate, the size of memory unit 60a required to store one video line of digital samples is 227 bytes or 1 RMU.

The delayed digital samples at the output of 1−H delay 60a are coupled to the negative input of a subtractor 53. Undelayed digital samples at the input of delay 52 are directly coupled to the positive input of subtractor 53. A reconstructed luminance signal $Y''_D$ is developed at the output of subtractor 53 that contains vertical detail information that is substantially the same as the vertical detail information contained in the signal $Y_D$ of interlaced luminance signal Y.

Reconstructed vertical detail signal $Y''_D$ is coupled to a vertical peaking circuit 57 to generate from the vertical detail a vertical peaking signal $Y''_P$. The vertical detail signal $Y''_D$, and the vertical peaking signal $Y''_P$ are added in an adder 58 to generate a peaked vertical detail signal $Y''_V$ that contains enhanced vertical detail information having peaked vertical transitions. Since vertical peaking is scaled as a function of contrast, vertical peaking stage 37 receives a contrast control signal to control the amount of peaking provided. A vertical peaking circuit responsive to contrast setting is described in copending U.S. patent application Ser. No. 599,536, by R. T. Fling, entitled, "Piece Wise Linear Digital Signal Processor for Digital Video Vertical Detail Processing38, herein incorporated by reference.

Digital samples of the enhanced vertical detail signal $Y''_V$, developed at the $f_{sc}$ rate, are coupled to a memory unit 60b of memory block 60. Memory unit 60b functions as a speed-up or time compression stage to time compress the signal $Y''_V$ into a time compressed, double-line rate signal $Y''_{2xV}$ with digital samples thereof being developed at the $2f_{sc}$ rate. To write into memory digital samples of the signal $Y''_V$, control terminal R/$\overline{W}$ is low during one line time, $1/f_H$. During this interval, sampling clock terminal CK1 is enabled and digital samples of the signal $Y''_V$ are written into memory by the clock signal $f_{sc}$,ck. During the next line time, control terminal R/$\overline{W}$ is high, to enable sampling clock terminal CK2. Stored samples of the signal $Y''_V$ are read out of memory at twice the write rate by the clock signal $2f_{sc}$,ck.

The time compressed enhanced vertical detail signal $Y''_{2xV}$ contains vertical peaking information that is to be displayed on the picture tube screen of the television receiver in pairs of noninterlaced display lines that have the peaking information opposing in polarity in alternate lines. To develop a vertical detail signal with peaking information of opposing polarities, the time compressed enhanced vertical detail signal $Y''_{2xV}$ is directly coupled to an input port D2 of a multiplexer MUX 2 and is coupled to an input port D1 of the multiplexer via an inverter 59. The clock signal $f_H$,ck, developed at control clock terminal CKM, is coupled to the select terminal of MUX 2.

During the time period of a compressed video line when the high state of the clock signal $f_H$,ck is developed at select terminal SEL, the signal $Y''_{2xV-}$ is transferred from input port D1 to output port D3 of MUX 2. During the next time compressed line period when select terminal SEL is low, then the signal $Y''_{2xV+}$ is transferred from input port D2 to output port D3. The signal $Y_{2xV-}$ is the signal $Y''_{2xV}$ after inversion, and the signal $Y_{2xV+}$ is the signal $Y''_{2xV}$ without inversion.

The signal $Y''_{2xV-+}$ generated at output port D3 comprises time compressed lines of the signal $Y''_{2xV-}$ containing vertical peaking of one polarity alternating with time compressed lines of the signal $Y_{2xV+}$ containing vertical peaking of the opposite polarity. This enhanced vertical detail information is combined with the high frequency liminance information to develop the restored luminance signal appearing at the luminance output signal line 70Y of proscan processor PSP.

To generate the high frequency luminance information that is combined with the enhanced vertical detail signal $Y''_{2xV-+}$, vertical detail information in interlaced luminance signal Y is deleted. To accomplish the deletion, luminance signal Y is coupled to the positive input of a subtractor 55 via a delay 56, which compensates for processing delays in the vertical detail extraction and speed-up channel. The extracted vertical detail signal $Y''_D$ is coupled to the negative input of subtractor 55 via a linear interpolator 54.

Linear interpolator 54 generates four digital samples at its output for every one digital sample coupled to its input. A straight line interpolation is used, to generate digital samples at the output of the interpolator that contains three interpolated samples between two successive real samples. Thus, the sample rate of the interpolated vertical detail signal $Y''_{ID}$ at the output of interpolator 54 is $4f_{sc}$, four times that of the signal $Y''_D$.

Vertical detail signal $Y''_{ID}$ is subtracted from luminance signal Y to remove low frequency luminance information. A high frequency luminance signal $Y''_{cm}$ is developed at the output of subtractor 55. Luminance signal $Y''_{cm}$ contains substantially the same high frequency information as that contained in luminance signal $Y_{cm}$ that is part of interlaced luminance signal Y.

Digital samples of high frequency luminance signal $Y''_{cm}$, developed at the $4f_{sc}$ rate, are coupled to a memory unit 60c of memory bank 60. Memory unit 60c functions as a speed-up or time compression stage for the luminance signal $Y''_{cm}$ to generate two time compressed lines of a high frequency luminance signal $Y''_{2xcm}$ for each line of luminance signal $Y''_{cm}$.

Digital samples of luminance signal $Y''_{cm}$ are written into memory during one line period, $1/f_H$, when control terminal R/$\overline{W}$ is low, enabling sampling clock terminal CK3 to clock samples into memory at the $4f_{sc}$ rate. Digital samples of the time compressed, high frequency luminance signal $Y''_{2xcm}$ are developed during the next $1/f_H$ line period, when control terminal R/$\overline{W}$ is high, enabling sampling clock terminal CK4 to clock out of memory unit 60c, digital samples at an $8f_{sc}$ rate.

Because high frequency luminance information is being stored in memory unit 60c, one video line of high frequency luminance information contains 910 digital samples or bytes, equal to a memory size of approximately 4 RM0U.

To restore the enhanced vertical detail information into the time compressed, high frequency luminance signal $Y''_{2xcm}$, the vertical detail signal $Y''_{2xV-+}$ is coupled to an input of an adder 61 via an interpolator 62. Interpolator 62 is a linear interpolator similar in design to interpolator 54 except that the input sample rate is $2f_{sc}$ and the output sample rate is $8f_{sc}$.

A time compressed, enhanced vertical detail signal, $Y''_{2xIV}$, at a sampling rate of $8f_{sc}$, is developed at the output of interpolator 62 and coupled to adder 61. Time compressed high frequency luminance signal $Y''_{2xcm}$ is coupled to the other input of adder 61 to generate on luminance output signal line 70Y of speed-up processor PSP, a time compressed luminance signal containing enhanced vertical detail information with vertical peaking of opposite polarities in alternate time compressed lines of display video.

To generate the time compressed I and Q signals on output signal lines 60I and 60Q of progressive scan speed-up processor PSP, digital samples of the I and Q signals, each developed at the $f_{sc}$ rate, are coupled to respective memory units 60d and 60e. Memory units 60d and 60e function in a manner identical to that of unit 60b to provide speed-up or time compression of the I and Q signals to generate the time compressed, double line rate signals $I''_{2x}$ and $Q''_{2x}$. Because the I and Q signals contain relatively low frequency information, less memory is required for memory units 60d and 60e than for memory unit 60c. To store one video line of the I or Q signals requires 227 bytes of storage or 1 RMU of memory for each of memory units 60d and 60e.

By inserting the enhanced vertical detail information to the high frequency luminance information, after the signals containing these types of information are time compressed rather than before the signals are time compressed, only memory unit 60c, that stores high frequency luminance information, requires relatively large amounts of storage. Furthermore, by providing for parallel operation of two speed-up processors, PSP1 and PSP2, not only the generation of an enhanced luminance signal containing vertical peaking of opposite polarities in alternate time compressed lines of video, but also the actual time compression of the luminance signal are accomplished using integrated circuit building blocks that are substantially alike and that require relatively little memory storage capacity.

What is claimed is:

1. A progressive scan processor, comprising:

input means for receiving an interlaced composite video input signal and having a first output for providing a luminance signal having suppressed vertical detail and a second output for providing a vertical detail signal;

peaking means coupled to said second output of said input means for producing a peaked vertical detail signal;

first speed-up memory means coupled to said first output of said input means for doubling the line rate of said luminance signal by alternately storing each line of said luminance signal in first and second memories and recovering each stored line twice during first and second read cycles as one line is being stored to provide a double line-rate luminance output signal having repeated lines with each line thereof having suppressed vertical detail;

second speed-up memory means coupled to said peaking means for doubling the line rate of said peaked vertical detail signal by alternately storing each line thereof in third and fourth memories and recovering each stored line twice as one line is being stored to provide a double line-rate peaked vertical detail output signal;

output means coupled to said first and second speed-up memory means for combining said double line rate signals and for reversing the polarity of said double line rate peaked vertical detail signal from line-to-line to provide a progressively scanned non-interlaced luminance output signal in which each line is repeated and includes a peaked vertical detail component which alternates polarity from line to line.

2. A progressive scan processor as recited in claim 1 wherein said double line rate signals are digital signals sampled at different rates and wherein said output means includes interpolator means for effectively increasing the sample rate of said double line rate peaked vertical detail signal.

3. A progressive scan processor as recited in claim 1 wherein said input means includes analog to digital converter means for sampling said composite video input signal at a first clock rate and includes subsampling means for producing samples of said vertical detail signal at a lower clock rate.

* * * * *